Figure 2:
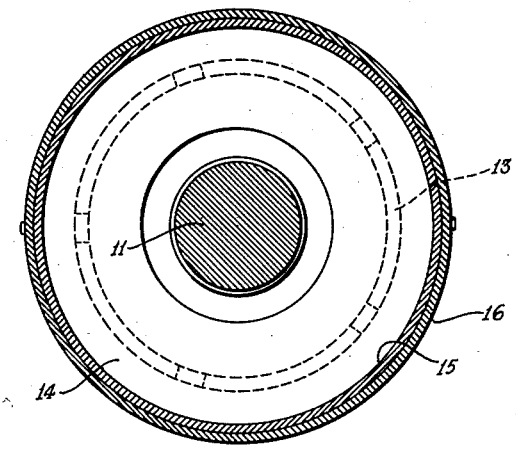

May 26, 1953

J. E. COOK 2,639,953

BEARING ASSEMBLY FOR ABSORBING VIBRATIONS
OF CENTRIFUGE SPINDLES AND THE LIKE
Filed Jan. 2, 1951

INVENTOR.
James. E. Cook.

BY

ATTORNEYS

Patented May 26, 1953

2,639,953

UNITED STATES PATENT OFFICE 2,639,953

BEARING ASSEMBLY FOR ABSORBING VIBRATIONS OF CENTRIFUGE SPINDLES AND THE LIKE

James Edward Cook, Poughkeepsie, N. Y., assignor to The De Laval Separator Company, New York, N. Y., a corporation of New Jersey Application January 2, 1951, Serial No. 204,043

5 Claims. (Cl. 308—184)

This invention relates to bearing assemblies for centrifuge spindles, and the like, which are subject to considerable vibration incident to their rotation. It has particular reference to an improved bearing assembly for damping such vibrations.

The usual bearing assemblies for this purpose comprise a yielding radial support surrounding the spindle bearing and acting to cushion the lateral vibrations of the spindle and bearing, so as to reduce the vibrations transmitted to the stationary frame or housing in which the parts rotate. The yielding radial support has generally taken the form of a series of radial springs or an annular rubber cushion disposed around the bearing. Both of these forms as used heretofore have met with certain difficulties. For example, the radial springs sometime fail to center the spindle properly after the bearing assembly is installed, which brings about an undesirable condition. While the use of a rubber cushion largely or entirely avoids this particular difficulty, the inherent characteristics of the rubber have resulted in other difficulties, due principally to the stresses to which the rubber is subjected when compressed in the usual manner around the bearing.

Another difficulty with these prior bearing assemblies is that they require considerable space in the centrifuge housing, since the housing recess for the assembly must be of sufficient diameter to accommodate the compression springs or cushion radiating from the bearing itself. In centrifuges of the smaller sizes, particularly, the relatively large overall diameter of the bearing assembly is a serious disadvantage.

The present invention is directed to the provision of an improved bearing assembly wherein the lateral vibrations of the spindle are cushioned by a rubber-like body which is arranged so as to avoid a heavy concentration of stresses therein and which, at the same time, does not increase the diameter of the assembly substantially beyond the diameter of the bearing itself.

A bearing assembly made according to the invention comprises a stationary housing surrounding the spindle with a clearance. A bearing in the housing closely surrounds the spindle and has inner and outer races, there being an annular space between the outer race and the side wall of the housing. An annular element closely surrounds and is movable radially with the outer race, this element being preferably in the form of a sleeve in which the outer race has an axially sliding fit. The sleeve is spaced from the side wall of the housing and has a part projecting axially of the spindle from the annular space between the housing and bearing into the clearance between the spindle and housing, the sleeve being spaced from the spindle. An annular body of rubber-like material is displaced axially from the annular space between the bearing and housing and is secured to the projecting part of the sleeve. The inner portion of this body is spaced from the spindle but is located nearer the spindle axis than is the inner wall of the annular space between the bearing and the housing, so that the rubber-like body overlies the bearing. A retaining member on the frame is spaced from the sleeve and surrounds and engages the rubber-like body. This retaining member serves to confine the rubber-like body against bodily movement while its inner portion overlying the bearing yieldingly resists radial movement of the sleeve, the bearing and the spindle.

With this arrangement, the rubber-like body for cushioning the vibrations can be made with a large radial thickness without appreciably increasing the overall diameter of the bearing assembly, and therefore the housing recess for the assembly may be of relatively small diameter. At the same time, by reason of the manner of connecting the rubber-like body to the housing and the bearing, the inner portion of this body overlying the bearing can be made to undergo a shear-like action in resisting the lateral vibrations of the spindle, the stresses tending to shear the body being distributed quite uniformly around the rubber-like body.

Figure 1:
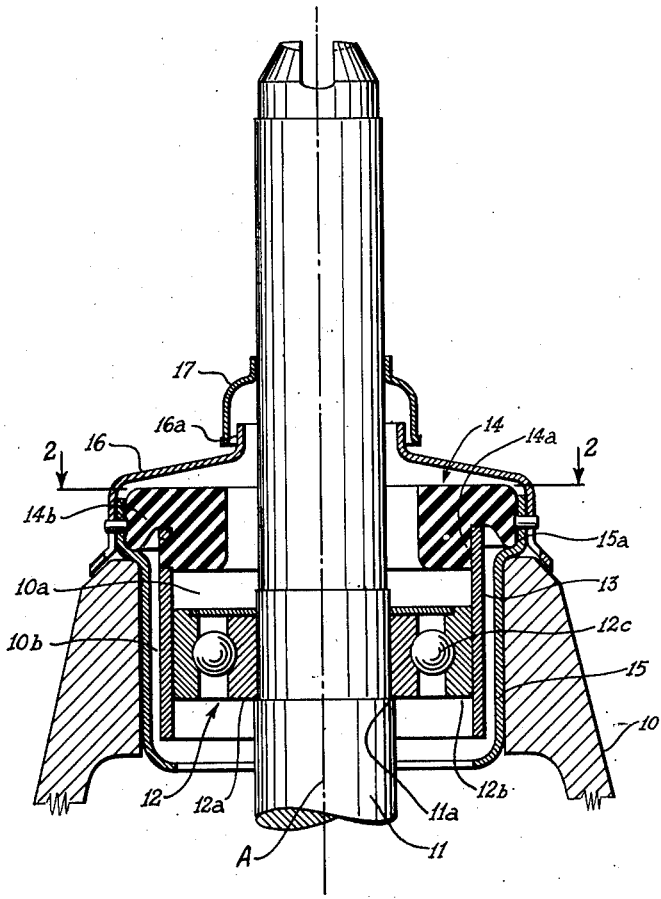

For a better understanding of the invention, reference may be had to the accompanying drawing, in which Fig. 1 is a vertical sectional view of a preferred form of the new bearing assembly, and Fig. 2 is a sectional view on the line 2—2 in Fig. 1.

Referring to the drawing, the numeral 10 designates the frame or housing of a centrifuge having a vertical spindle 11 on which the centrifugal bowl (not shown) is rotated, the spindle being driven in any suitable manner. The spindle 11 is closely surrounded by a bearing 12 including an inner race 12a, and outer race 12b and intermediate ball bearings 12c. The inner race 12a is seated on a shoulder 11a of the spindle, so that the bearing moves vertically with the spindle. The bearing 12 is located in a recess in the upper portion of the housing 10, this recess providing a clearance 10a between the spindle and the side wall of the housing. Between the outer race 12b of the bearing and the side wall of the housing is an annular space 10b which permits radial movements of the bearing relative to the housing incident to rotation of the spindle.

An annular element in the form of a sleeve 13 closely surrounds the outer race 12b, the bearing having a sliding fit in the sleeve to permit axial movement of the bearing relative to the sleeve. The sleeve 13 projects upwardly from the annular space 10b into the clearance 10a, the sleeve being spaced from the side wall of the housing. At its upper or projecting portion the sleeve 13 is secured to an annular rubber-like body 14, as by molding the sleeve to the body 14. The rubber-like body is located in the clearance 10a between the spindle and the housing and is spaced axially from the annular space 10b and the bearing 12. It has an inner portion 14a fitted closely in the upper portion of the sleeve, this inner portion being spaced from the spindle 11 but located nearer the spindle axis A than is the inner wall of the annular space 10b, that is, the outer surface of the race 12b. Thus, the inner portion 14a of the rubber-like body overlies a substantial portion of the bearing 12 in axially spaced relation thereto. The body 14 also has an outer portion 14b extending over the top of sleeve 13 and outwardly a substantial distance therefrom.

A retaining member 15, which is shown in the form of an outer sleeve, is fitted closely in the housing recess 10a and has a flange 15a closely surrounding the outer portion 14b of the rubber-like body. This flange 15a is seated on the top of the housing so as to support the sleeve 15 therein. A cover piece 16 is releasably secured to the outer sleeve 15, as by means of a bayonet type joint. The cover 16 extends inwardly over the rubber-like body 14 and has a neck 16a surrounding the spindle but spaced slightly therefrom, the spacing being adequate to accommodate the maximum radial displacements of the spindle incident to its rotation. Above the cover 16 is a dust cover 17 secured to the spindle and extending downwardly around the neck 16a in spaced relation thereto.

In the operation of the new bearing assembly, the inner sleeve 13 partakes of the radial movements of the spindle 11 and its bearing 12, although this sleeve permits axial movements of the spindle and bearing in the sleeve. The radial movements of the sleeve are resisted yieldingly by the rubber-like body 14. That is, while the latter is confined by the retaining member 15 against bodily movement, the inner portion of the body 14 can flex radially incident to the lateral movements of the inner sleeve 13. This flexing is brought about by the tendency of the radial movements of sleeve 13 to shear the inner portion 14a of the body from the portion overlying the sleeve 13. In addition to this resistance-in-shear imposed by the inner portion 14a, a further resistance to radial movements of the bearing is imposed by the outer portion 14b of the rubber-like body. That is, as the sleeve 13 is displaced in one direction from the normal axis of the spindle, the part of the outer portion 14b lying in the direction of displacement is compressed against the flange 15a of the retaining member. Due to the tendency for the rubber-like body 14 to assume the shape illustrated in Fig. 1, this body acts to return the spindle to its center position.

It will be apparent that the new assembly is of relatively simple construction and, while occupying only a small space in the housing 10, is extremely effective to damp the radial vibrations of the spindle. Since the forces imposed upon the rubber-like body 14 incident to radial displacement of the spindle are distributed over a considerable portion of the rubber-like body, the latter can be used for a long period of time without replacement. The entire assembly, including the parts 13, 14, 15 and 16, can be removed as a unit from the housing along with the spindle 11, since the retaining member 15 is slidable in the housing recess 10a. The removable cover 15 permits ready access to the cushion 14.

I claim:

1. A bearing assembly for the spindle of a centrifuge, or the like, which comprises a stationary housing having a side wall surrounding the spindle with a clearance, a bearing in the housing closely surrounding the spindle and having inner and outer races, there being an annular space between the outer race and the side wall of the housing, an annular element closely surrounding the outer race and movable radially therewith, said element being spaced from the side wall of the housing and having a part projecting from said space axially of the spindle and into said clearance in spaced relation to the spindle, an annular body of rubber-like material displaced axially from said annular space and secured to said projecting part, the inner portion of said body being spaced from the spindle but located nearer the spindle axis than is the annular element, and a retaining member on the housing spaced from said element and surrounding and engaging said body to confine the same against bodily movement while said inner portion yieldingly resists radial movement of said element, bearing and spindle, the rubber-like body having said inner portion thereof fitted closely in the annular element and having another portion extending outwardly from said annular element to the retaining member.

2. A bearing assembly according to claim 1, in which the retaining member has a flange engaging the outer periphery of the rubber-like body and also has a shoulder axially supporting said body.

3. A bearing assembly according to claim 1, in which the retaining member is a sleeve surrounding said element and slidable axially in the side wall of the housing, the sleeve having an outwardly extending part resting on the housing.

4. A bearing according to claim 1, comprising also a cover overlying the rubber-like body and releasably secured to the retaining member.

5. A bearing assembly according to claim 1, in which the outer race of the bearing has an axially sliding fit in said element.

JAMES EDWARD COOK.

References Cited in the file of this patent

UNITED STATES PATENTS

| Number | Name | Date |
|---|---|---|
| 1,387,158 | Leitch | Aug. 9, 1921 |
| 1,695,230 | Curtis | Dec. 11, 1928 |
| 2,526,443 | Woodson | Oct. 17, 1950 |